(12) United States Patent
Mitra et al.

(10) Patent No.: US 12,551,113 B1
(45) Date of Patent: Feb. 17, 2026

(54) AUDIO DETECTION AND MONITORING OF RESPIRATION

(71) Applicant: Apple Inc., Cupertino, CA (US)

(72) Inventors: Vikramjit Mitra, Fremont, CA (US); Agni Kumar, Milton, GA (US); Carolyn R. Oliver, Sunnyvale, CA (US); Adeeti V. Ullal, Emerald Hills, CA (US); Matthew Biddulph, San Francisco, CA (US); Irida Mance, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 830 days.

(21) Appl. No.: 17/394,314

(22) Filed: Aug. 4, 2021

Related U.S. Application Data

(60) Provisional application No. 63/094,263, filed on Oct. 20, 2020.

(51) Int. Cl.
*A61B 5/0205* (2006.01)
*A61B 5/00* (2006.01)
(Continued)

(52) U.S. Cl.
CPC ........ *A61B 5/0205* (2013.01); *A61B 5/02438* (2013.01); *A61B 5/0816* (2013.01); *A61B 5/6898* (2013.01); *A61B 5/7267* (2013.01); *A63B 24/0062* (2013.01); *G06N 20/00* (2019.01); *G10L 25/66* (2013.01); *H04R 3/005* (2013.01); *A63B 2230/045* (2013.01); *A63B 2230/42* (2013.01)

(58) Field of Classification Search
CPC . A61B 5/0205; A61B 5/02438; A61B 5/0816; A61B 5/6898; A61B 5/7267; A61B 7/003; A61B 5/08; A63B 24/0062; A63B 2230/045; A63B 2230/42; G06N 20/00; G10L 25/66; H04R 3/005
See application file for complete search history.

(56) References Cited

U.S. PATENT DOCUMENTS

| | | | |
|---|---|---|---|
| 2019/0000350 A1* | 1/2019 | Narayan | G16H 50/50 |
| 2020/0152330 A1* | 5/2020 | Anushiravani | G16H 70/60 |
| 2020/0349965 A1* | 11/2020 | Nesta | G06N 3/088 |

OTHER PUBLICATIONS

Barbaro, et al., "Dyspnea perception in asthma: Role of airways inflammation, age and emotional status," Respiratory Medicine, vol. 105, No. 2, pp. 195-203, 2011.
(Continued)

*Primary Examiner* — Tse W Chen
*Assistant Examiner* — Evelyn Grace Park
(74) *Attorney, Agent, or Firm* — BAKERHOSTETLER

(57) ABSTRACT

The subject technology provides a framework for estimating respiratory rates from audio data recordings. A multi-task learning network may be trained to output respiratory rates, breathing conditions, and/or noise conditions based on input audio data recordings. The audio data recordings may be generated using wearable audio devices with near-field microphones. The respiratory rates may be provided along with other workout information by a health application of an electronic device. Additional sensor data and/or health data may be used in combination with the audio data and/or the respiratory rates and/or breathing conditions for respiratory and/or other health monitoring by an electronic device.

28 Claims, 10 Drawing Sheets

(51) Int. Cl.
    A61B 5/024    (2006.01)
    A61B 5/08     (2006.01)
    A63B 24/00    (2006.01)
    G06N 20/00    (2019.01)
    G10L 25/66    (2013.01)
    H04R 3/00     (2006.01)

(56)            References Cited

OTHER PUBLICATIONS

Bernhardt, et al., "Respiratory Symptom Perception Differs in Obese Women with Strong or Mild Breathlessness During Constant-Load Exercise," Chest, vol. 145, No. 2, pp. 361-369, 2014.
Borg, "Psychophysical bases of perceived exertion." Medicine & Science in Sports & Exercise, 1982.
Castro, et al., "Real-Time Identification of Respiratory Movements through a Microphone," Advances in Distributed Computing and Artificial Intelligence Journal, vol. 3, No. 3, 2014.
Celli, et al., "Predictors of survival in copd: more than just the fev1," Respiratory Medicine, vol. 102, pp. S27-S35, 2008.
Gil, et al., "Balance-Oriented Focal Loss with Linear Scheduling for Anchor Free Object Detection," arXiv preprint arXiv:2012.13763, 2020.
Hendren, et al., "Implications of perceived dyspnea and global well-being measured by visual assessment scales during treatment for acute decompensated heart failure," The American journal of cardiology, vol. 124, No. 3, pp. 402-408, 2019.
Heo, et al., "End-to-end losses based on speaker basis vectors and all-speaker hard negative mining for speaker verification," arXiv preprint arXiv:1902.02455, 2019.
Jensen, et al., "Effects of pregnancy, obesity and aging on the intensity of perceived breathlessness during exercise in healthy humans," Respiratory physiology & neurobiology, vol. 167, No. 1, pp. 87-100, 2009.

Kendall, et al., "Multi-Task Learning Using Uncertainty to Weigh Losses for Scene Geometry and Semantics," Proceedings of the IEEE Conference on Computer Vision and Pattern Recognition, 2018, pp. 7482-7491.
Li, et al., "Design of Wearable Breathing Sound Monitoring System for Real-Time Wheeze Detection," Sensors, vol. 17, No. 1, p. 171, 2017.
Lin, et al., "Focal Loss for Dense Object Detection," Proceedings of the IEEE International Conference on Computer Vision, pp. 2980-2988, 2017.
Liu, et al., "End-to-End Multi-Task Learning with Attention," Proceedings of the IEEE Conference on Computer Vision and Pattern Recognition, 2019, pp. 1871-1880.
Nakanishi, et al., "Relationship of dyspnea vs. typical angina to coronary artery disease severity, burden, composition and location on coronary ct angiography," Atherosclerosis, vol. 230, No. 1, pp. 61-66, 2013.
Nicolo, et al., "Respiratory Frequency during Exercise: The Neglected Physiological Measure," Frontiers in physiology, vol. 8, p. 922, 2017.
Pan, et al., "All-cause and cause-specific mortality from restrictive and obstructive spirometric patterns in Chinese adults with and without dyspnea: Guangzhou Biobank Cohort Study," Respiratory Medicine, vol. 151, pp. 66-80, 2019.
Pang, et al., "Is there a clinically meaningful difference in patient reported dyspnea in acute heart failure? an analysis from urgent dyspnca," Heart & Lung, vol. 46, No. 4, pp. 300-307, 2017.
Ren, et al., "Fine-grained Sleep Monitoring: Hearing Your Breathing with Smartphones," in 2015 IEEE Conference on Computer Communications (Infocom). IEEE, 2015, pp. 1194-1202.
Sierra, et al., "Comparison of respiratory rate estimation based on tracheal sounds versus a capnograph," in 2005 IEEE Engineering in Medicine and Biology 27th Annual Conference. IEEE, 2006, pp. 6145-6148.
Sierra, et al., "Monitoring respiratory rate based on tracheal sounds. first experiences," in The 26th Annual International Conference of the IEEE Engineering in Medicine and Biology Society, vol. 1. IEEE, 2004, pp. 317-320.

* cited by examiner

AUDIO DETECTION AND MONITORING OF RESPIRATION

CROSS REFERENCE TO RELATED APPLICATIONS

This application claims the benefit of priority to U.S. Provisional Patent Application No. 63/094,263, entitled "AUDIO DETECTION AND MONITORING OF RESPIRATION," filed on Oct. 20, 2020, the disclosure of which is hereby incorporated herein in its entirety.

TECHNICAL FIELD

The present description generally relates to developing machine learning applications.

BACKGROUND

Software engineers and scientists have been using machine learning to make improvements across different industries.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
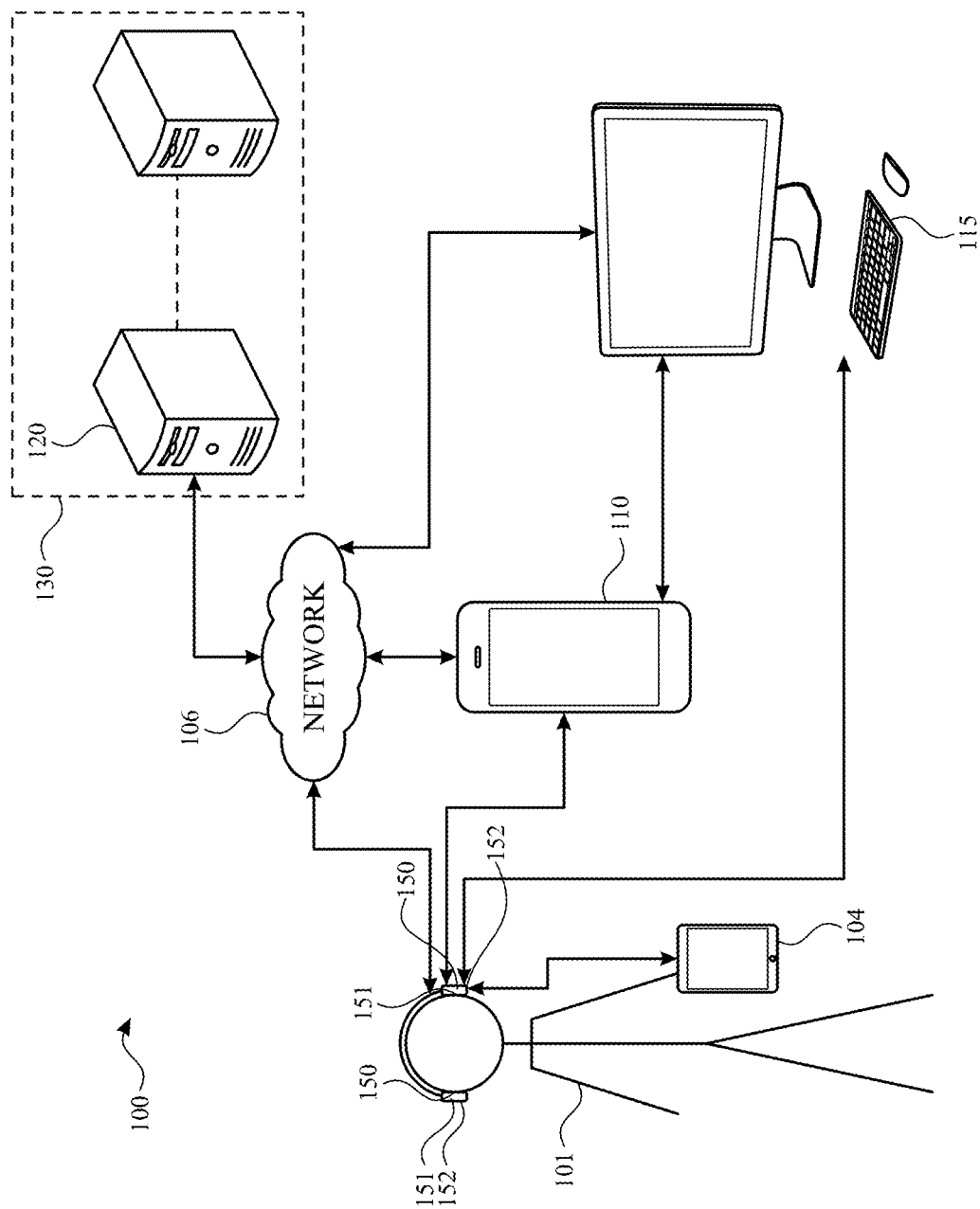
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a significant rise in popularity in recent years due to the availability of massive amounts of training data, and advances in more powerful and efficient computing hardware. Machine learning may utilize models that are executed to provide predictions in particular applications (e.g., detecting breathing, breathing conditions, respiratory rates, etc.) among many other types of applications.

Breathlessness, or dyspnea, is a common symptom in many acute and chronic clinical conditions. Acute breathlessness often occurs during an asthmatic episode or heart attack, while chronic breathlessness is frequently a symptom of low cardiovascular fitness and obesity, chronic obstructive pulmonary disease (COPD), and/or congestive heart failure (CHF). Breathlessness on exertion is also a strong independent predictor of mortality, and can be used as a clinical metric for assessing and monitoring disease progression. The primary classifications of heart failure (NYHA Class I-IV) are defined in terms of breathlessness, either occurring at rest or during normal levels of physical activity.

Breathlessness scores as quantified by the Borg Dyspnea Scale, used to assess clinical severity of diseases such as peripheral artery disease (PAD) and other respiratory disorders, are typically subjective patient-reported measures. Individuals with such conditions are typically required to interface with a healthcare provider in order for their symptoms to be recognized.

Aspects of the subject technology may provide an improvement to the functioning of a computing device and/or other machine by providing objective systems and methods for breathlessness detection. The disclosed systems and methods may lower the burden in identifying this symptom, and may include feature for alerting healthcare providers to patients' underlying medical conditions (e.g., before disease progression would have been observed in a clinical setting).

Aspects of the subject technology provide a breathlessness measurement tool that estimates respiratory rates on exertion in a healthy population using audio from a microphone such as a microphone in wearable headphones. In one or more implementations, a multi-task learning network is trained to estimate a respiratory rate and/or other features of respiratory activity from an audio recording or audio stream (e.g., a live audio stream) of the user. The multi-task networks described herein may facilitate the use of external microphones such as microphones in wearable headphones for respiratory monitoring and/or analysis. The subject technology may also provide a technologically efficient and/or cost-effective method to track cardiorespiratory fitness over time. While sensors such as thermistors, respiratory gauge transducers, and acoustic sensors can be used to provide an estimation of a person's breathing patterns, these sensors can be intrusive and may not be comfortable for everyday use. In contrast, wearable headphones, the use of which may be facilitated by the multi-task networks described herein, are relatively economical, accessible, aesthetically acceptable, and comfortable.

The subject technology may facilitate detection and categorization of particular breath sounds without expending computing resources to detect and categorize particular breath sounds and, thus without using such detected and categorized breath characteristics to distinguish between healthy and abnormal breath sounds. The subject technology may facilitate respiratory rate estimation without the use of contact-based sensors to obtain tracheal sounds in one or more implementations.

Implementations of the subject technology improve the computing functionality of a given electronic device by facilitating the sensing of breathing sounds and patterns which can be used to distinguish between normal and heavy breathing, and/or to estimate a respiratory rate (e.g., in the context of fitness activity). The subject technology may further facilitate the use of versatile noncontact sensors, such as wearable near-field microphones to provide audio data for respiratory monitoring such as for detection of breathlessness.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an audio device 150, an electronic device 104 (e.g., a wearable device such as a smart watch), an electronic device 110 (e.g., a handheld electronic device such as a smartphone or a tablet), an electronic device 115, and a server 120 communicatively coupled by a network 106 (e.g., a local or wide area network). For explanatory purposes, the system architecture 100 is illustrated in FIG. 1 as including the audio device 150, the electronic device 104, the electronic device 110, the electronic device 115, and the server 120; however, the system architecture 100 may include any number of electronic and/or audio devices and any number of servers or a data center including multiple servers.

The audio device 150 may be implemented as headphones (e.g., a pair of speakers mounted in speaker housings that are coupled together by a headband) or an earbud (e.g., an earbud of a pair of earbuds each having a speaker disposed in a housing that conforms to a portion of the user's ear) configured to be worn by a user (also referred to as a wearer when the audio device is worn by the user). Each audio device 150 may include one or more speakers such as speaker 151 configured to project sound into an ear of the user 101, and one or more microphones such as microphone 152 configured to receive external audio input.

The audio device may include communications circuitry for communications (e.g., directly or via network 106) with the electronic device 104, the electronic device 110, the electronic device 115, and/or the server 120, the communications circuitry including, for example, one or more wireless interfaces, such as WLAN radios, cellular radios, Bluetooth radios, Zigbee radios, near field communication (NFC) radios, and/or other wireless radios. The electronic device 104, the electronic device 110, the electronic device 115, and/or the server 120 may include communications circuitry for communications (e.g., directly or via network 106) with audio device 150 and/or with the others of the electronic device 104, the electronic device 110, the electronic device 115, and/or the server 120, the communications circuitry including, for example, one or more wireless interfaces, such as WLAN radios, cellular radios, Bluetooth radios, Zigbee radios, near field communication (NFC) radios, and/or other wireless radios.

In one or more implementations, the audio device 150 may also include one or more machine learning models that are trained to analyze the breathing of user 101. In one or more implementations, the electronic device 110 may provide a system for training a machine learning model using training data, where the trained machine learning model is subsequently deployed locally at the electronic device 110, the electronic device 104, and/or the audio device 150. Further, the electronic device 110 may provide one or more machine learning frameworks for training machine learning models and/or developing applications using such machine learning models. In an example, such machine learning frameworks can provide various machine learning algorithms and models for different problem domains in machine learning. In an example, the electronic device 110, the electronic device 104, and/or the audio device 150 may include a deployed machine learning model that provides an output of data corresponding to a prediction or some other type of machine learning output responsive to an audio data input (e.g., a breath output corresponding to a breath rate, a number of breaths, and/or an identified breathing condition, and/or a noise output such as an identified noise condition responsive to one or more audio samples).

In one or more implementations, the server 120 may train a given machine learning model for deployment to a client electronic device (e.g., the electronic device 104, the electronic device 110, and/or the audio device 150). The machine learning model deployed on the server 120, the electronic device 104, the audio device 150, and/or the electronic device 110 can then perform one or more machine learning algorithms. The server 120 may provide a system for training a machine learning model using training data, where the trained machine learning model is subsequently deployed to the server 120. In an implementation, the server 120 provides a cloud service that utilizes the trained machine learning model and continually learns over time.

The audio device 150 may be communicatively coupled to a base device such as the electronic device 104, the electronic device 110 and/or the electronic device 115. Such a base device may, in general, include more computing resources and/or available power in comparison with the audio device 150. In an example, audio device 150 may operate speaker 151 to play audio content provided from electronic device 104, electronic device 110, and/or electronic device 115 using speaker 151. In one or more implementations, audio device 150 may obtain audio data using microphone(s) 152, such as in response to a trigger received from electronic device 104 and/or electronic device 110.

For instance, electronic device 104 and/or electronic device 110 may receive an input such as a user input that indicates the start of a physical activity (e.g., a walk, a run, a hike, a bicycle ride, a high intensity interval training (HIIT) activity, or the like) and, responsive to the input, provide an instruction to audio device to obtain one or more audio samples using microphone 152 during and/or after the physical activity. The memory of audio device 150 may store one or more machine learning models (referred to herein as breath models and/or noise models) for determining when breathing by the user 101 is detected, for identifying a breathing condition (e.g., heavy breathing or normal breathing), and/or for identifying aspects of the user's breathing such as a breath count or a breath rate (e.g., a respiratory rate in breaths per minute). In other examples, audio data obtained by the audio device 150 may be provided to electronic device 104 and/or electronic device 110) for determining (e.g., using machine learning models as described herein) when breathing by the user 101 is detected, for identifying a breathing condition (e.g., heavy breathing or normal breathing), and/or for identifying aspects of the user's breathing such as a breath count or a breath rate (e.g., in breaths per minute).

In one or more implementations, sensor data from one or more other sensors of audio device 150, electronic device 104, electronic device 110 and/or one or more other devices of the user may be obtained during and/or after the physical activity (e.g., in coordination with the audio sampling by audio device 150).

Audio device 150 may also include one or more sensors such as touch sensors and/or force sensors for receiving user input. For example, a user/wearer of audio device 150 may tap a touch sensor or pinch the force sensor briefly to control the audio content being played, to control volume of the playback, to begin and/or end an audio recording session, and/or to toggle between the transparent and noise-cancelling modes of operation.

The electronic device 104 may be, for example, a wearable device such as a smart watch, a smart band, and the like, or any other appropriate device that includes, for example, processing circuitry and/or communications circuitry for providing audio content to audio device(s) 150, receiving audio data from audio device(s) 150, and/or obtaining additional sensor data. By way of example, the electronic device 104 may be implemented as a smart watch that includes one or more light based sensors such as photoplethysmography (PPG) sensors for detecting heart beats, heart rates, other heart beat characteristics, and/or blood oxygen levels.

The electronic device 110 may be implemented as a smartphone, a portable computing device such as a laptop computer, a peripheral device (e.g., a digital camera, headphones), a tablet device, or other computing device. In FIG. 1, by way of example, the electronic device 115 is depicted as a smartphone. The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. In one or more implementations, the electronic device 104, the electronic device 110, the electronic device 115, and/or the audio device 150 may be, and/or may include all or part of, the electronic device discussed below with respect to the electronic system discussed below with respect to FIG. 11.

The server 120 may form all or part of a network of computers or a group of servers 130, such as in a cloud computing or data center implementation. For example, the server 120 stores data and software, and includes specific hardware (e.g., processors, graphics processors and other specialized or custom processors). In an implementation, the server 120 may function as a cloud storage server.

Figure 2:
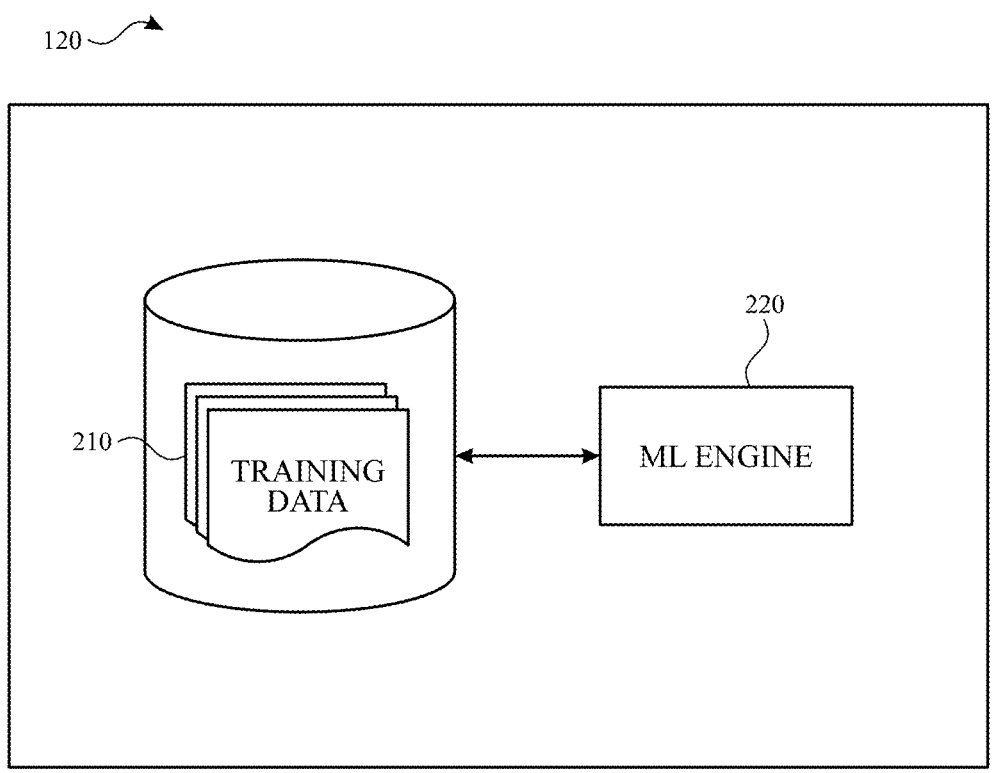
FIG. 2 illustrates an example computing architecture for training machine learning models in accordance with one or more implementations.

FIG. 2 illustrates an example computing architecture for a system providing breath analysis using machine learning models, in accordance with one or more implementations. For explanatory purposes, the computing architecture is described as being provided by the server 120, such as by a processor and/or memory of the server 120; however, the computing architecture may be implemented by any other electronic devices, such as the electronic device 110. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, training data 210 may be provided for training a machine learning engine 220. In an example, one or more ML models of machine learning engine 220 may be trained based on training data 210. Training data 210 may include, for example, input training data such as audio data collected from multiple individuals using, for example, microphone-enabled, near-field headphones before, during, and after a physical activity such as strenuous exercise. For example, input training data in the training data 210 may include segmented audio samples, each having a length of between three and ten seconds. The training data 210 may also include output training data such as known breath counts, known respiratory rates (RR), known breathing conditions (e.g., heavy breathing or normal breathing), and/or known noise conditions (e.g., noise or no noise) corresponding to the input training data audio samples.

Respiratory Rate (RR) is a clinical metric that can be used to assess overall health and physical fitness. A RR for an individual can change from her/his baseline RR due to, for example, chronic illness symptoms (e.g., asthma, congestive heart failure) or acute illness (e.g., breathlessness due to infection), and/or during the course of a day due to physical exhaustion such as during heightened exertion. Machine learning models of machine learning engine 220 may be trained to perform detection of breathlessness that can be performed at any location (e.g., remotely from a clinical location such as a doctor's office or hospital), which can provide a cost-effective and technologically efficient mechanism to track, for example, disease progression and cardiorespiratory fitness over time. In one or more implementations, machine learning engine 220 may include one or more ML models that are trained to estimate a RR from recorded audio, using the training data 210 (e.g., including short audio segments obtained after physical exertion in healthy individuals).

In one or more implementations, ML engine 220 may be implemented as a multi-task Long-Short Term Memory (LSTM) network (e.g., with convolutional layers to process mel-filter bank energies) that estimates a respiratory rate (RR), and/or predicts a heavy breathing condition (e.g., indicated by an RR of more than 30 breaths per minute) and/or a background noise condition. The multi-task learning network may perform both classification and regression tasks, leveraging a mixture of multiple loss functions, as described in further detail hereinafter. In one or more implementations, the RR can be estimated by machine learning engine 220 with a concordance correlation coefficient (CCC) of, for example, 0.7-0.8 (e.g., 0.75 or 0.76), with a mean squared error (MSE) of, for example, 0.15-0.25 (e.g., 0.2) demonstrating that audio can be a viable signal for estimating RRs. Implementations in which machine learning engine 220 includes convolution operations may be effective at generating RR estimates and robust against data sparsity.

After the machine learning model(s) of ML engine 220 have been trained and deployed, audio data captured using, for example, audio device(s) 150, may be obtained and provided to ML engine 220, for generation of respiratory and/or other breathing estimates. Audio data may be generally captured at any time and/or over any duration of time. However, respiratory rates may be estimated more accurately when the data is captured at various times associated with a physical activity, and/or for a duration of time that includes at least one breath cycle (e.g. including an inhale and an exhale).

Figure 3:
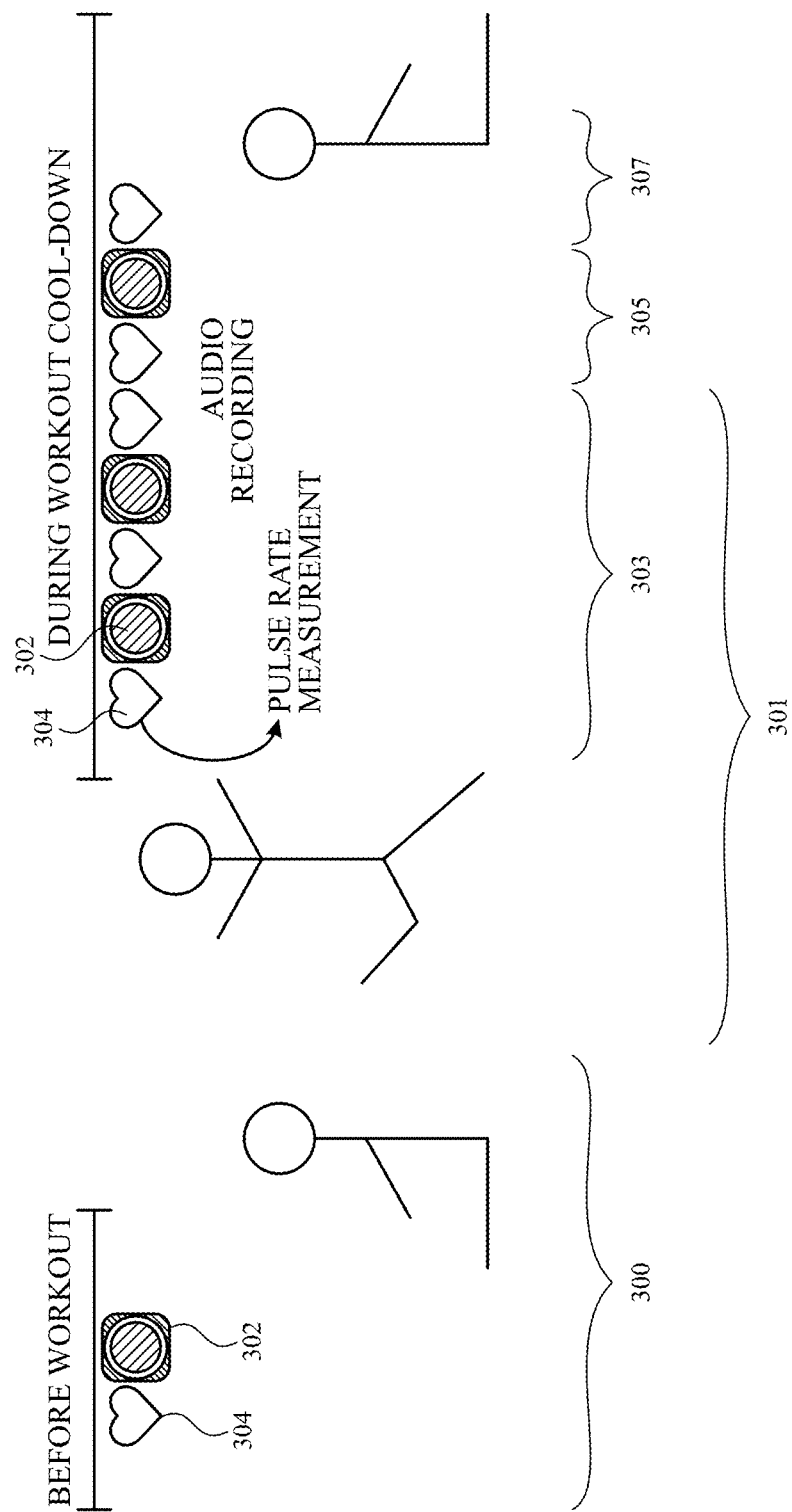
FIG. 3 illustrates various examples time periods during which audio data for breath analysis may be obtained in accordance with one or more implementations.

For example, FIG. 3 illustrates how one or more audio samples 302 (e.g., recorded audio and/or live audio stream samples) may be obtained (e.g., using audio device(s) 150 and/or another recording device) at one or more times during a period of time 300 before a physical activity (e.g., a workout), at one or more times during a period of time 301 during the physical activity (e.g., including a period of time 303 just before the end of the physical activity), and at one or more times during a period of time 305 just after the end of the physical activity. In one or more implementations, audio samples 302 and/or samples of other sensor data 304 may also be obtained during a cool-down period 307 after the physical activity has ended.

In one or more implementations, information from another device may be used to determine when to obtain the audio samples 302 and/or other sensor data 304, and/or to determine which of the obtained samples to select to provide to machine learning engine 220. For example, a health application running on electronic device 104 and/or electronic device 110 may receive a user input indicating the beginning of a workout. As another example, sensors such as IMU sensors, heartrate sensors, altitude sensors, GPS sensors or the like at electronic device 104 and/or electronic device 110 may detect the beginning of a physical activity without user input, the detection causing the start of a recording of a physical activity by a health application. The initiation (e.g., whether by the user or by sensor detection) of a physical activity recording at a health application at electronic device 104 and/or electronic device 110 may trigger the collection of audio samples 302 and/or other sensor data 304 (e.g., at various times such as random times) during the physical activity.

At the end of the physical activity, the user and/or the sensors may indicate to the health application that the physical activity has ended. In one or more implementations, the audio device 150 may obtain one or more additional audio samples (e.g., and the electronic device 104 and/or electronic device 110 may obtain one or more additional samples of other sensor data) during the period of time 305 immediately after (e.g., within one minute or any number of minutes and/or seconds after) the end of the physical activity, and then during the cool-down period 307. Electronic device 104 and/or electronic device 110 may also use the time at which the physical activity recording ended at electronic device 104 and/or electronic device 110 to determine which of the obtained audio samples 302 to select for analysis by ML engine 220.

For example, higher RRs of the breaths recorded in audio samples 302 may increase the chances of detecting breathing and/or observing heavy breathing. Because the user's exercises can vary in intensity (e.g., during various activities such as running, biking, HIIT, calisthenics, walking, fast walking, or walking up an incline), and because audio samples may be recorded in various noise environments (e.g., including indoors or outdoors, and/or differing workout environments such as at a public gym or using home exercise equipment), the audio samples 302 that are not dominated by noise (e.g., audio samples that include breath-only or a mix of breath and noise) may be the audio samples 302 obtained during the time periods of time 303 and 305 that occur, during (e.g., just before the end), and immediately after workouts, when breathing is at its heaviest. Accordingly, audio samples 302 obtained during the workout (e.g., during the period of time 305 just before the end of the workout) and during period of time 305 immediately after the workout (e.g., within one minute of the end of the workout) may be selected and provided to ML engine 220.

In one or more implementations, training data for training the ML model(s) of ML engine 220 may include audio data recorded by multiple (e.g., greater than twenty) training participants, using microphone-enabled, near-range headphones, including, for example, a pair of wireless earbuds. For example, in one or more data collection trials, each training participant may record multiple (e.g., four) one minute audio clips before (e.g., during a first minute), during (e.g., toward the end such as during the fifth minute), immediately after (e.g., during a sixth minute), and while cooling down following completion (e.g., during an eighth minute) of a (e.g., nine-minute) workout session, in which six minutes of the workout session involved physical exercise. Various workout types may be selected for generation of the training audio data and/or audio data for respiratory analysis, to induce heavy breathing, with the goal of, for example, doubling participants' resting heart rates at the peak of physical exertion.

Additional data such as pulse rates in beats per minute (bpm) may also be obtained (e.g., using a wrist-worn sensor such as one or more optical sensors and/or touch sensors of an smart watch) at, for example, six points in the exercise session. For example, the additional sensor data (e.g., heart rate data) may be obtained in connection with (e.g., before, during, or after) recording an audio clip before the start of a workout, in connection with (e.g., before, during, or after) recording an audio clip during the workout (e.g., during minute 5), and/or in connection with (e.g., before and after) recording an audio clip immediately after (e.g., during minutes 6 and 7) and during cool-down (e.g., minutes 8 and 9).

In one or more implementations, the recorded training audio sessions may be segmented into (e.g., randomly-selected) lengths between, for example, three and ten or between four and seven seconds, to increase the probability that an audio segment contains at least one breath cycle. In order to generate training output data for the audio segments, the segments may be manually annotated with a corresponding respiratory rate. For example, the annotation process may include counting the number of inhale/exhale cycles in each audio sample, and dividing the breath cycle count by the clip duration in minutes to achieve respiratory rate measures in breaths per minute for each audio segment. Annotations for various audio samples during each of the various stages before, during, immediately after, and during cool-down after a workout can provide ground truth values for training.

In one or more implementations, a spectrogram for each audio segment may be generated. In comparison with spectrograms for normal breathing audio segments, intense exercise spectrograms indicative of heavy breathing may show more frequent energy bursts and lack harmonic structure, indicating both a higher RR and greater presence of background noise than in a normal breathing sample. Temporal spectral representations of audio data may thus be useful audio inputs for distinguishing between normal and heavy breathing, which can be implemented in ML engine 220 using temporal convolution and recurrent layers in one or more models as described in further detail hereinafter. During training/validation/evaluation operations, to evaluate the robustness of the ML engine 220 against unseen acoustic conditions, random ambient noise may be added to the evaluation audio sets (e.g., at signal-to-noise ratios between 20 to 60 dB).

In one or more implementations, training data may be upsampled to yield higher respiratory rates and/or additional training data may be obtained during extended workout durations to increase the model's ability to detect heavy breathing.

Figure 4:
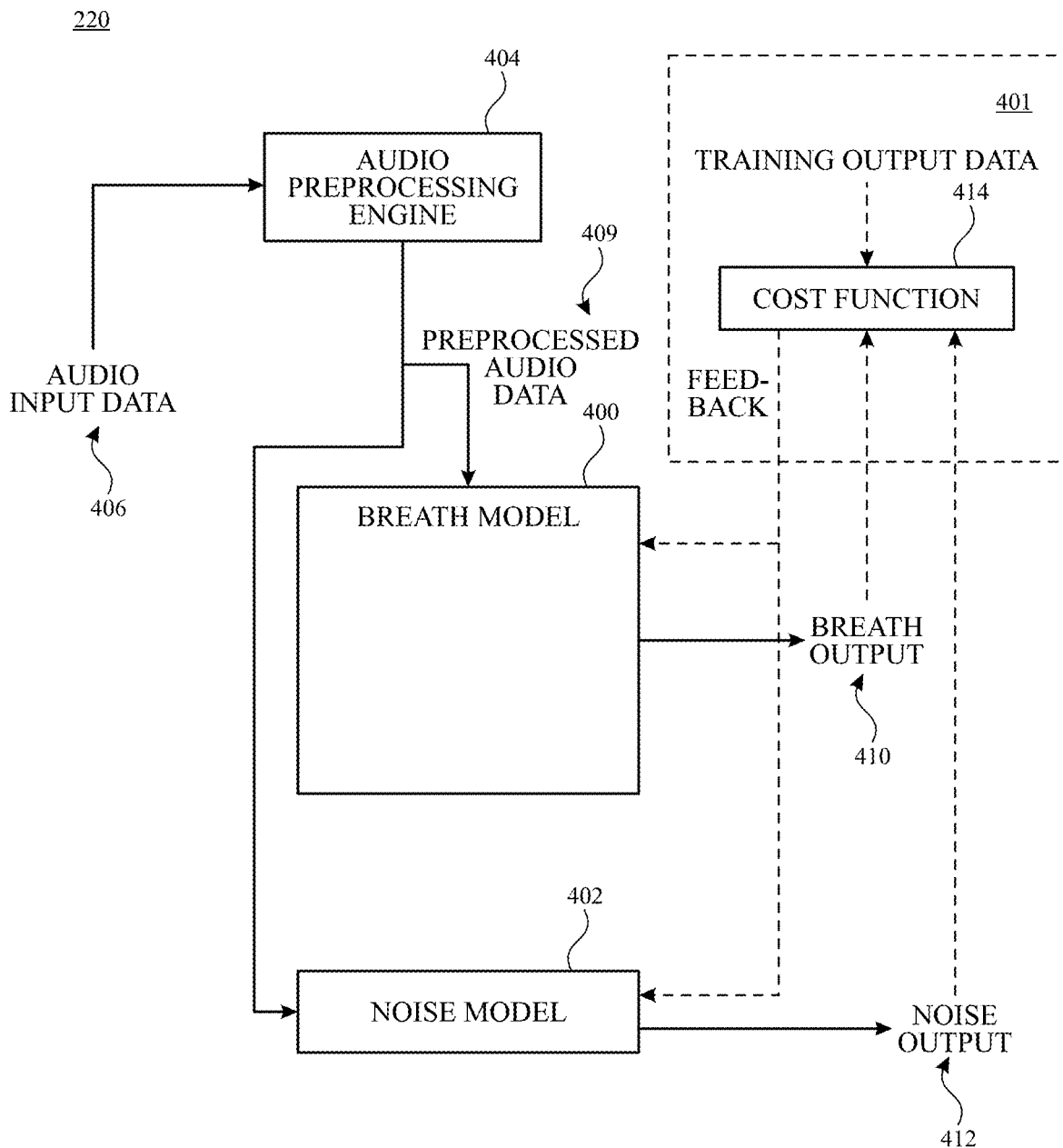
FIG. 4 illustrates a schematic flow diagram for respiratory analysis using machine learning models in accordance with implementations of the subject technology.

FIG. 4 illustrates a schematic flow diagram of a respiratory analysis that may be performed using ML engine 220 (e.g., implemented as a multi-task learning architecture), responsive to receiving selected audio samples 302. For example, one or more audio samples 302 may be selected and provided as audio input data 406 to the ML engine 220. As shown, ML engine 220 may include an audio preprocessing engine 404 that preprocesses the audio input data 406. For example, preprocessing the audio input data may include merging multiple audio recordings form multiple microphones (e.g., associated with two earbuds) into a single audio stream, segmenting audio samples into shorter samples (e.g., into audio samples having a length of between three and ten seconds), performing transformation operations (e.g., to generate spectrograms) on the audio samples, performing convolution operations (e.g., time-convolution operations such as operations to compute mel-filter bank energies), performing spoken sound rejection operations (e.g., to discard any audio samples with recorded speech to preserve privacy), and/or otherwise preprocessing the audio input data 406. For example, in one or more implementations, the audio preprocessing engine 404 may perform privacy preserving operations such as speech detection operations. For example, in one or more implementations, the audio preprocessing engine 404 may provide the audio input data 406 to a speech detection engine that outputs a binary speech/no-speech flag. Audio samples that are flagged to include any speech (e.g., include any recording of human voices) may be discarded and deleted from the device.

As shown in FIG. 4, the preprocessed audio data 409 may be provided to one or more trained machine learning models of the ML engine 220, including a breath model 400 and a noise model 402. In various implementations, breath model 400 and/or noise model 402 may include, for example, one or more recurrent and/or fully connected embedding layers and/or one or more convolutional layers. As shown, the breath model 400 may, responsive to receiving the preprocessed audio data 409 (e.g., or directly receiving the audio input data 406 without preprocessing), output a breath output 410. For example, the breath output 410 may include a classifier output indicating a breathing condition (e.g., heavy breathing or normal breathing) of breaths detected in the preprocessed audio data 409. The breath output 410 may also include a breath count and/or a breath rate (also referred to as a respiratory rate or RR) of breaths detected in the preprocessed audio data 409.

As shown in FIG. 4, the noise model 402 may, responsive to receiving the preprocessed audio data 409 (e.g., or responsive to directly receiving the audio input data 406 without preprocessing), output a noise output 412. The noise output 412 may, for example, be a binary output indicating a noise condition or a no-noise condition. The breath output 410 and the noise output 412 may be generated for each audio sample 302 and/or for a single period of time corresponding to two or more obtained audio samples 302 (e.g., a single breath output 410 and noise output 412 corresponding to a workout recorded in a health application may be generated). In one or more implementations, the breath output 410 and the noise output 412 (e.g., and/or the obtained audio samples and/or other sensor data 304 obtained in connection with the obtained audio samples) may be stored and/or viewable in connection with a recorded workout in the health application.

FIG. 4 also illustrates how a training system 401 may be provided (e.g., as a part of the ML engine 220 or separately from the ML engine 220) for training the breath model 400 and the noise model 402. As shown, the breath output 410 and/or the noise output 412 may be compared with training output data (e.g., a known respiratory rate, a known breath count, a known breathing condition, and/or a known noise condition corresponding to input training data) using a cost function 414, to generate feedback for adjusting the parameters (e.g., weights, biases, etc.) of the breath model 400 and/or the noise model 402. For example, the cost function 414 may be a convex mixture of multiple loss functions (e.g., including a concordance correlation coefficient (CCC) loss, a breath cross entropy (CE) loss, and a noise cross entropy loss).

Figure 5:
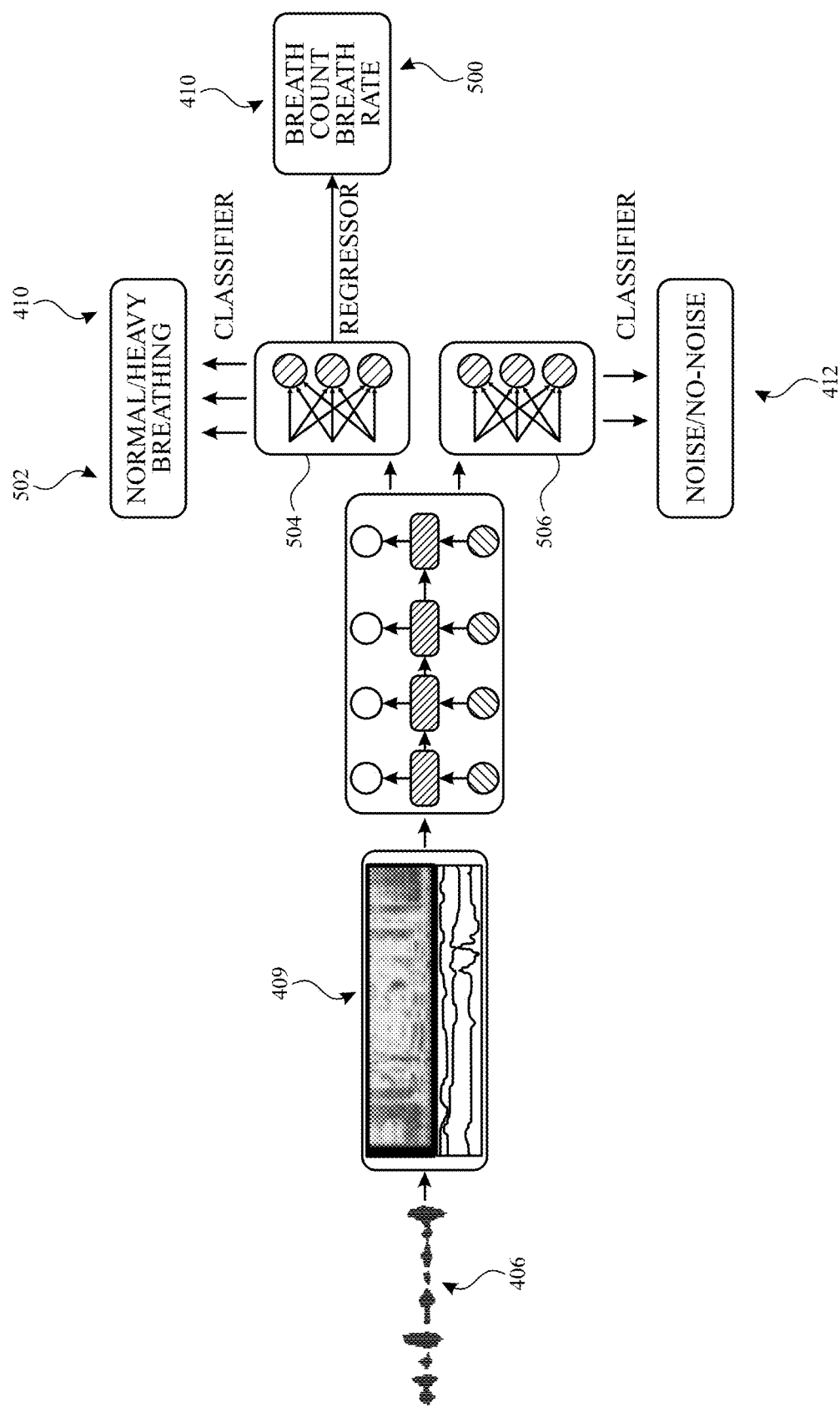
FIG. 5 illustrates features of an example multi-task learning architecture in accordance with one or more implementations.
Figure 6:
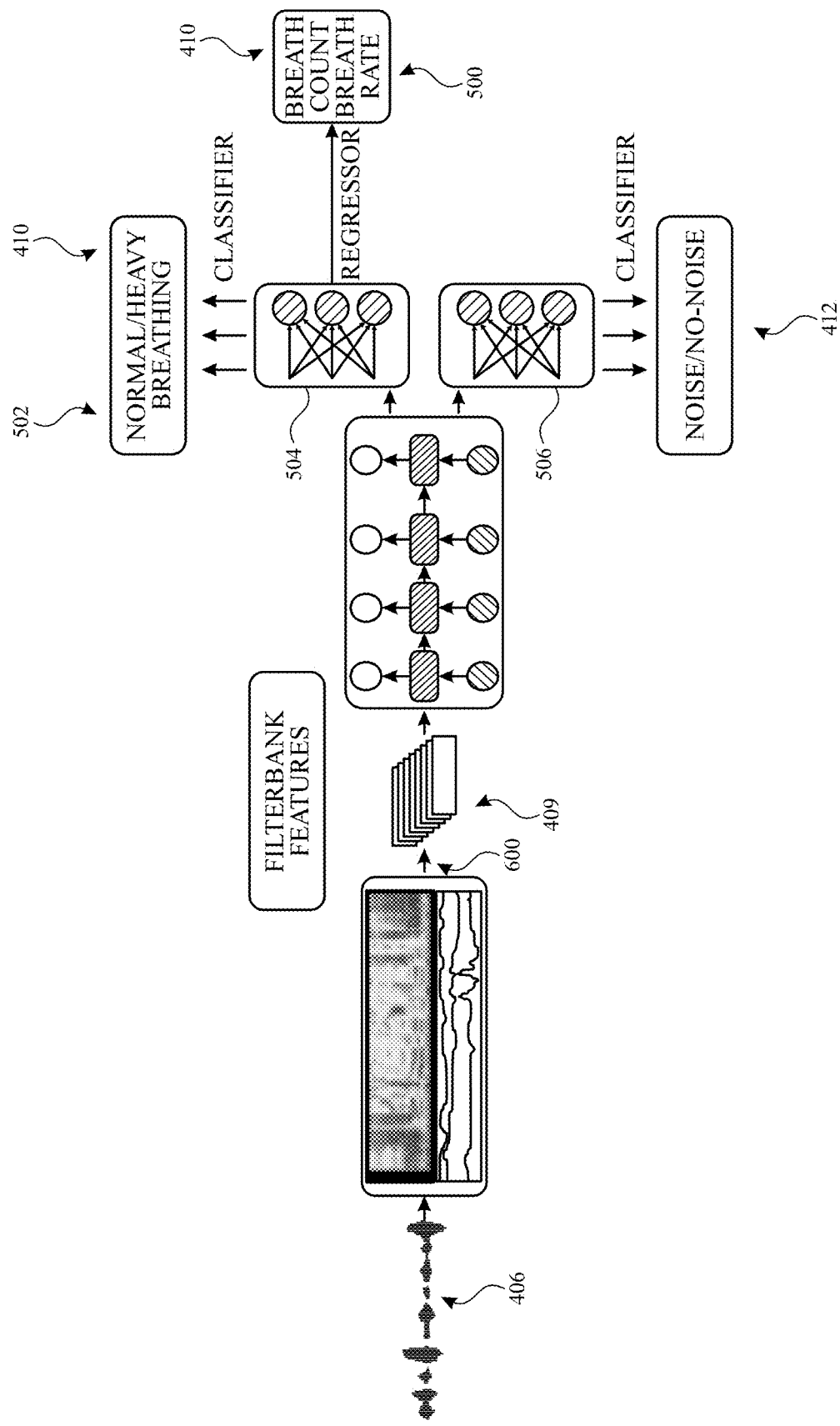
FIG. 6 illustrates features of another example multi-task learning architecture in accordance with one or more implementations.

Further details of example implementations of ML engine 220 using a multi-task learning architecture are shown in the examples of FIGS. 5 and 6. In the example of FIG. 5, a multi-task learning architecture is implemented as a multi-task Long-Short Term Memory (LSTM) network. In the example of FIG. 6, the multi-task learning architecture is implemented as a time-convolutional multi-task LSTM (TC-LSTM).

The multi-task LSTM of FIG. 5 or the TC-LSTM of FIG. 6 may be implemented, for example, as a single layer LSTM with 16, 32 and/or 64 neurons in the recurrent and the embedding layers respectively. As shown in FIGS. 5 and 6, a multi-task LSTM or multi-task time-convolutional LSTM may generate three outputs. As shown, the three outputs may include two breath outputs 410, such as a two-dimensional output 500 corresponding to respiratory rate (RR) and respiration count (RC) estimates for the audio input data 406, and a two- or three-dimensional output 502 reflecting two or three possible classes (e.g., two or more of no breathing detected, normal breathing detected, and/or heaving breathing detected) for the audio input data 406. Normal breathing may be detected, for example, when the RR is between five and twenty-five or thirty breaths per minute (BPM). Heavy breathing may be detected when, for example, the RR is greater than twenty-five or thirty BPM, in exemplary implementations. As shown, the three outputs may also include a two-dimensional output corresponding to the noise output 412 (e.g., including a noise condition or a noiseless condition) for the audio input data 406.

The breath model 400 and the noise model 402, depicted in each of FIGS. 4, 5, and 6, may have been trained with multiple objective functions as a multi-task learning (MTL) network. In the MTL networks of FIGS. 5 and 6, the multiple tasks include (i) RR estimation, (ii) heavy breathing detection, and (iii) noise detection, represented by the three outputs as mentioned above. In one or more implementations, audio segments used to train the model may be provided with varying lengths, meaning that two segments of differing lengths could have the same RR but different RCs. In these implementations, RC may be included as a target in the multi-task objective function to provide the models with the ability to generalize across temporal durations and also learn correlations between RC and RR.

The individual losses from each of the tasks (i), (ii), and (iii) described above are shown in Equation (1) below $$CCC_{cost} := \alpha CCC_{RR} + (1-\alpha)CCC_{RC} \quad (1)$$

$$CE(x)_{breath} := w_{breath}\left(-x_{breath} + \log\sum_i \exp(x[i])\right),$$

$$CE(y)_{noise} := w_{noise}\left(-x_{noise} + \log\sum_j \exp(y[j])\right)$$

where the concordance correlation coefficient (CCC) loss is used on the RR and RC outputs, and weighted cross entropy (CE) loss is used on the breath and noise classification task.

Additionally, a focal loss term may be determined for the breath detection task, and a convex mixture of all the losses as defined in Equation (2) below:

$$MTL_{loss} = \quad (2)$$
$$\beta CCC_{cost} + \gamma CE(x)_{breath} + \kappa CE(y)_{noise} + (1-\beta-\gamma-\kappa)FL(x)_{breath},$$

may be used as the MTL loss (e.g., as the cost function 414 of FIG. 4) to train the network shown in either of FIG. 5 or 6. Equation 2a below shows another example of the MTL loss that may be used, in which weighting factors $\lambda_{CCC}$, $\lambda_{CEbreath}$, $\lambda_{CEnoise}$, and $\lambda_{FLbreath}$ are included in the CCC, $CE_{breath}$, $CE_{noise}$, and $FL_{breath}$ terms:

$$MTL_{loss} = \beta \cdot \lambda_{CCC} \cdot CCC_{cost} \quad (2a)$$
$$+\gamma \cdot \lambda_{CE_{breath}} \cdot CE(x)_{breath}$$
$$+\kappa \cdot \lambda_{CE_{noise}} \cdot CE(y)_{noise}$$
$$+(1-\beta-\gamma-\kappa) \cdot \lambda_{FL_{breath}} \cdot FL(x)_{breath}$$

The CCC for each of the RR and RC outputs may be defined by Equation (3) below:

$$CCC = \frac{2\rho\sigma_x\sigma_y}{\sigma_x^2 + \sigma_y^2 + (\mu_x - \mu_y)^2}, \quad (3)$$

where $\mu_x$ and $\mu_y$ are the means, $\sigma^2_x$ and $\sigma^2_y$ are the corresponding variances for the estimated and ground truth variables, and is $\rho$ the correlation coefficient between these two variables.

In one or more implementations, the models of FIGS. 4, 5, and/or 6 may be trained with a mini-batch size of, for example, sixty four, using Adam optimizer, with a learning rate of, for example, 0.01 and a momentum learning of, for example, 0.9. For all the model training steps, early stopping may be allowed based on cross-validation error.

As shown in FIGS. 5 and 6, the breath embedding layer 504 between the breath classification and RR/RC estimation tasks may be shared. FIGS. 5 and 6 also show how the noise classification task may have a separate noise embedding layer 506. The separate embedding layer of the noise classification task may have a smaller size (e.g., a fourth of the size) than the shared breath embedding layer.

With respect to the implementation shown in FIG. 5, preprocessed audio data 409 may be, and/or may include, one or more spectrograms formed from the audio input data 406. In this example, the spectrograms may be provided to the multi-task model input data.

In various implementations, the LSTM of FIG. 5 may be provided with 16, 32 and/or 64 neurons in the recurrent and embedding layers (e.g., for the breathing task). For example, Table 1 below shows an exemplary variation in performance with model size, where the evaluation metrics used were an F1-score for the classification task and CCC for the regression task, respectively. A Pearson's product-moment correlation coefficient (PPMCC) can also be determined for each model size in the validation and evaluation sets, with the PPMCC ranging between 0.85-0.88 for the validation sets and between 0.62 and 0.73 for the evaluation sets.

TABLE 1

CCC for RR and RC estimation, and F1-score for breath and noise classification tasks for the validation and evaluation sets, from MTL-LSTM network trained with MFB40 features

| Neurons | $CCC_{RR}$ | $CCC_{RC}$ | $F1_{breath}$ | $F1_{noise}$ |
|---|---|---|---|---|
| Validation | | | | |
| 16 | 0.79 | 0.78 | 57.55 | 88.82 |
| 32 | 0.88 | 0.87 | 64.76 | 89.61 |
| 64 | 0.85 | 0.83 | 56.53 | 93.65 |
| Evaluation | | | | |
| 16 | 0.59 | 0.57 | 49.20 | 66.91 |
| 32 | 0.73 | 0.70 | 66.33 | 76.81 |
| 64 | 0.62 | 0.58 | 52.82 | 65.04 |

As shown in Table 1 (and further based on the measured PPMCCs), in some scenarios, a model with 32 neurons in the LSTM layer, 32 neurons in the breath embedding layer, and 8 neurons in noise embedding layer may provide improved performance for both the validation and evaluation training data sets. Note that the model with 64 neurons (final row in Table 1) shows some degree of overfitting, where the performance gap between the validation and evaluation set was larger compared to the model with 32 neurons. This could be a consequence of the data volume limitation, as larger datasets may enable using models with more parameters.

With respect to the TC-LSTM implementation shown in FIG. 6, rather than providing spectrograms to the LSTM directly, in the TC-LSTM network, a convolution operation 600 (e.g., with a filter size of three) may be performed across time. In one or more implementations, the convolution operation 600 may use standard 40-dimensional mel-filterbank energy (MFB40) features with upper and lower cut-off frequencies of, for example, 0 and 7500 Hz. In other implementations MFBs with more than and/or less than 40 filterbanks may be used. In some scenarios, such as with a held-out variation set of training data as described herein, MFBs with 40 filterbanks provide better performance than MFBs with other numbers of filterbanks. In one or more implementations, the number of convolution filters may be the same as the number of input feature dimensions In the example of FIG. 6, the feature maps from the convolutional layer are fed as input to the succeeding LSTM network. In one or more implementations, the learning networks disclosed herein (e.g., the learning networks of FIGS. 5 and 6) may be implemented as end-to-end models that simultaneously encompass both regression and classification tasks. These learning networks can be particularly beneficial for the respiratory rate and/or breathlessness detection and/or determination operations described herein, as the architecture(s) of the network(s) have been arranged to be applied to the data described herein (e.g., audio data and heart rate data).

Table 2 below presents exemplary results of a comparison between the implementation of FIG. 5, and the implementation of FIG. 6 (e.g., including a time-convolution layer in the acoustic model and modulation features as an alternative feature representation). For the comparisons in Table 2, the number of neurons in the LSTM layer and the breath embedding layer are 32.

TABLE 2

CCC for RR and RC estimation, and F1-score for breath classification tasks for the evaluation set, from LSTM and TC-LSTM networks

| Model | $CCC_{RR}$ | $CCC_{RC}$ | $F1_{breath}$ |
| --- | --- | --- | --- |
| LSTM | 0.73 | 0.70 | 66.33 |
| TC-LSTM | 0.75 | 0.73 | 61.40 |

Table 2 shows that a RR can be estimated with a CCC as high as, for example, 0.75-0.76 (in this example), with a detection accuracy of breathing at 66%-72% F1-score. In this example, the PPMCC for the RR estimation may be approximately 0.73 and 0.78, and the MSE for the RR estimation may be approximately 0.32 and 0.31, for the LSTM and TC-LSTM networks respectively.

Table 3 below shows that the CCC may vary with different RR ranges.

TABLE 3

$CCC_{RR}$ from LSTM and TC-LSTM networks at different RR ranges

| System | all data | RR > 15 | RR > 25 |
| --- | --- | --- | --- |
| LSTM | 0.73 | 0.28 | 0.15 |
| TCLSTM | 0.75 | 0.42 | 0.28 |

In the example of Table 3, for higher RRs, the $CCC_{RR}$ was lower. However, this may be adjustable by providing additional training data with higher RRs during training. As shown in Table 3, the TC-LSTM implementation of FIG. 6 may perform better at higher RRs compared to LSTMs, indicating that the TC-LSTM implementation of FIG. 6 may be able to generalize well across sparse data samples.

In one or more implementations, during training, the CCC for RR estimation on a held-out validation set may be used to select the best epoch, and the model from that epoch may be used to obtain the performance on the held-out evaluation set.

Additional information with respect to performance for various RR ranges is shown in Table 4 below, using a comparison of MSE values across the LSTM and TC-LSTM models. The example of Table 4 also indicates that data augmentation may also be used, in one or more implementations, to improve the performance of an RR estimation model.

TABLE 4

| Model | below 15 | 15 to 25 | above 25 |
| --- | --- | --- | --- |
| LSTM | 0.33 | 0.43 | 0.29 |
| TC-LSTM | 0.32 | 0.42 | 0.22 |
| LSTM (augumented data) | 0.28 | 0.24 | 0.29 |
| TC-LSTM (augumented data) | 0.21 | 0.20 | 0.21 |

For example, because audio samples can be obtained in both indoor and outdoor conditions, it can be helpful to include training audio samples with representative indoor and outdoor noise. In some scenarios, outdoor training audio data may already contain natural ambient noise such as wind and traffic sounds, and indoor training audio data may be augmented by adding pseudostationary noise (e.g., noise reflective of appliance sounds and/or other indoor sounds) at various signal-to-noise ratios (SNRs) between, for example, 20 to 40 dB. In the example of Table 4, for each indoor training data file, noise was added at three different SNR levels, each of which was selected from a uniform distribution between 10 to 20 dB, 20 to 30 dB, and 30 to 40 dB, respectively. In this example, data augmentation was applied only on the training partition.

Table 4 indicates that the performance of RR estimation, in terms of MSE, varied at low (e.g., less than 15 breaths per minute), medium (e.g., between 15 and 25 breaths per minute), and high (e.g., greater than 25 breaths per minute) RR rates. Table 4 indicates that data augmentation can also be applied to help reduce the MSE for almost all the RR ranges. In one or more implementations, the TC-LSTM model described herein may perform better than the LSTM model, both with and without data augmentation across all participants.

Figure 7:
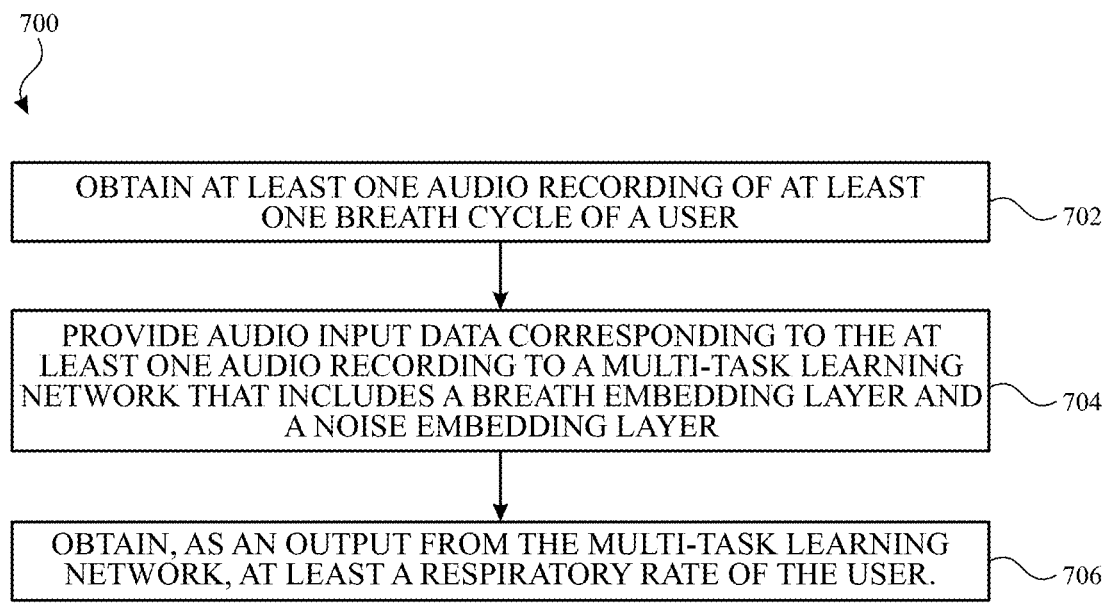
FIG. 7 illustrates a flow diagram of an example process for respiratory analysis using audio data in accordance with one or more implementations.

FIG. 7 illustrates a flow diagram of an example process for respiratory analysis using audio data in accordance with one or more implementations. For explanatory purposes, the process 700 is primarily described herein with reference to the audio device 150, electronic device 104, and the electronic device 110 of FIG. 1. However, the process 700 is not limited to the audio device 150, electronic device 104, and the electronic device 110 of FIG. 1, and one or more blocks (or operations) of the process 700 may be performed by one or more other components of the server 120 and/or by other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, at least one audio recording (e.g., including one or more audio samples 302) of at least one breath cycle of a user may be obtained. For example, obtaining the at least one audio recording of the at least one breath cycle of the user may include obtaining multiple audio recordings (e.g., including multiple of audio samples 302 or multiple portions of an audio sample 302) each having a duration of between three seconds and ten seconds (e.g., between four and seven seconds). In one or more implementations, obtaining the multiple audio recordings may include obtaining the audio recordings with a near-field microphone (e.g., a microphone 152) of a wearable audio device such as audio device 150. In one or more implementations, obtaining the multiple audio recordings may include obtaining the multiple audio recordings responsive to receiving a trigger from a health application on an electronic device such as electronic device 104 or electronic device 110. In one or more implementations, a speaker (e.g., a speaker 151) of the wearable audio device may output audio content (e.g., music, podcasts, or the like) received from the electronic device. In one or more implementations, obtaining the multiple audio recordings may include obtaining the multiple audio recordings while outputting the received audio content.

In one or more implementations, additional sensor data may be obtained with a sensor (e.g., a PPG sensor) of the electronic device. For example, the additional sensor data may include multiple heart rate (also referred to herein as pulse rate) measurements each corresponding to one of the multiple audio recordings.

In one or more implementations, obtaining the multiple audio recordings may include obtaining the multiple audio recordings at a corresponding plurality of times (e.g., randomized times) associated with a recording of a workout by the electronic device. For example, the corresponding plurality of times may include at least one time within approximately a minute prior to an end time of the workout and at least one time within approximately a minute after the end time of the workout.

At block 704, audio input data (e.g., audio input data 406 or preprocessed audio data 409) corresponding to the at least one audio recording may be provided to a multi-task learning network (e.g., an implementation of ML engine 220 such as one of the implementations shown in FIG. 5 or 6) that includes a breath embedding layer (e.g., breath embedding layer 504) and a noise embedding layer (e.g., noise embedding layer 506). In one or more implementations, providing the audio input data to the multi-task learning network includes providing the audio input data to the multi-task learning network at the wearable audio device. In other implementations, the multiple audio recordings may be provided to the electronic device, and providing the audio input data to the multi-task learning network may include providing the audio input data to the multi-task learning network at the electronic device. In other implementations, the multiple audio recordings may be provided to an additional electronic device (e.g., directly from the wearable audio device or via the electronic device), and providing the audio input data to the multi-task learning network may include providing the audio input data to the multi-task learning network at the additional electronic device. In one or more implementations, the electronic device may be a smart watch and the additional electronic device may be a smartphone.

In one or more implementations, the audio input data may be generated by preprocessing (e.g., with audio preprocessing engine 404) the at least one audio recording (e.g., by preprocessing the multiple audio recordings). For example, generating the audio input data may be performed by generating at least one spectrogram from at least one audio recording. In one or more implementations (see, e.g., FIG. 6), generating the audio input data further may include performing a time-convolution of the at least one spectrogram.

In one or more implementations, prior to generating the at least one spectrogram, an audio device, the electronic device, or the additional electronic device may determine whether a portion of the at least one audio recording includes a recording of human speech. In one or more implementations, any portion of the at least one recording that includes the recording of the human speech may be discarded (e.g., permanently deleted from storage). In this way, inadvertent recording of a user or another person can be avoided while collecting audio samples for respiratory analysis.

At block 706, at least a respiratory rate of the user may be obtained as an output from the multi-task learning network. In one or more implementations, the respiratory rate may be provided for display in association with additional information for the workout by a user interface of the health application (e.g., as described in connection with FIG. 8 below). In one or more implementations, a breathing condition (e.g., normal breathing, heavy breathing, or no breathing detected) of the user may be obtained as an additional output from the multi-task learning network (e.g., from a breath embedding layer of the multi-task learning network). In one or more implementations, a noise condition of the at least one audio recording may be obtained as an further additional output from the multi-task learning network (e.g., from a noise embedding layer of the multi-task learning network). For example, obtaining the respiratory rate and the breathing condition may include obtaining the respiratory rate and the breathing condition with the breath embedding layer of the multi-task learning network, and obtaining the noise condition of the at least one audio recording may include obtaining the noise condition with the noise embedding layer of the multi-task learning network.

As described herein, a ML engine 220 with one or more machine learning models, trained using human-annotated exercise data consisting of audio samples 4-7 seconds in duration, may provide for estimation of respiratory rate and detection of heavy breathing and noise with high confidence. In one or more implementations, an electronic device such as electronic device 104 or electronic device 110 may provide a user experience for controlling the recording of audio data, and/or for outputting the results of a respiratory analysis.

Figure 8:
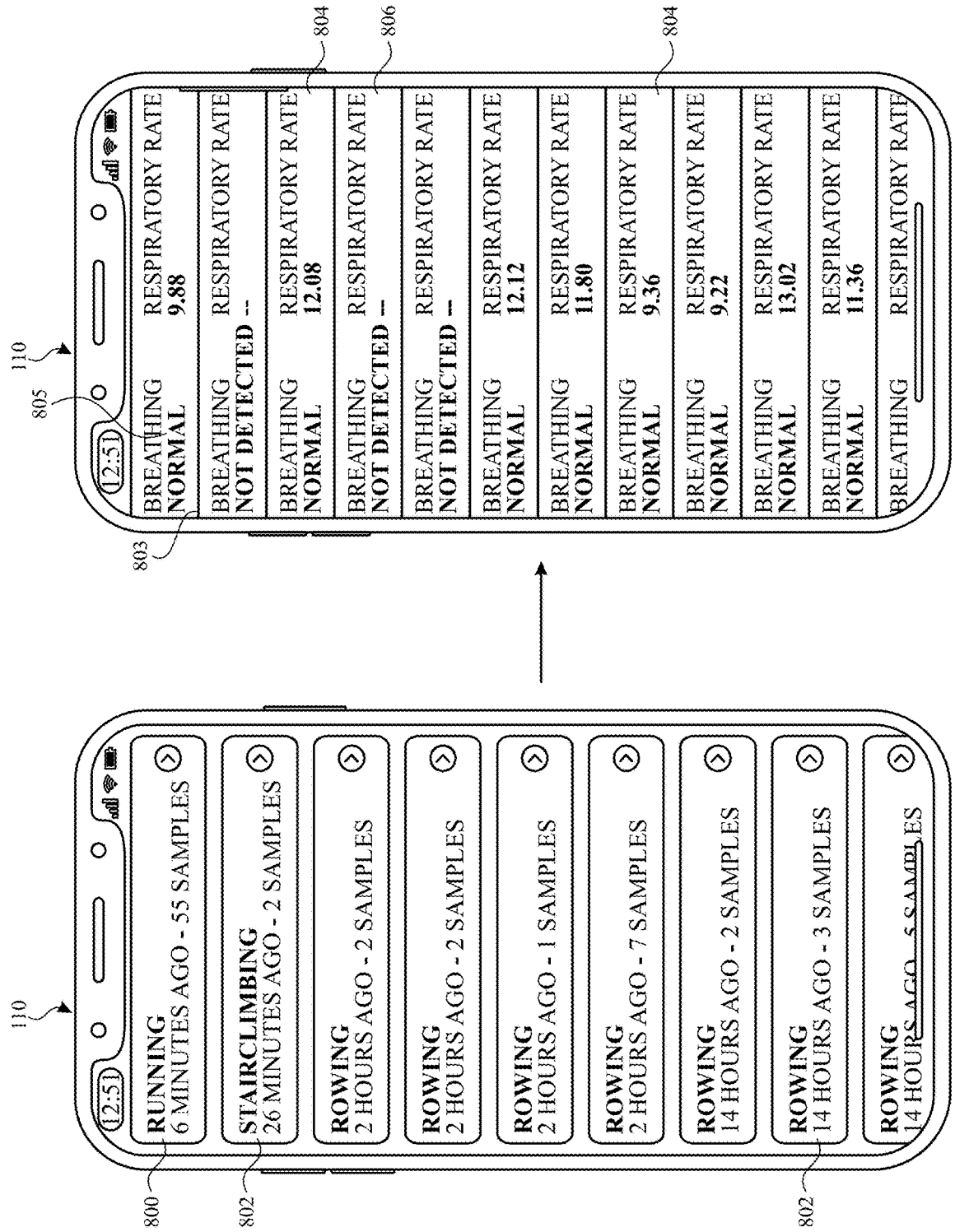
FIG. 8 illustrates exemplary user interface views of an application that utilizes breath data from a multi-task learning network in accordance with one or more implementations.

FIG. 8 illustrates a user interface view 800 of a health application running on electronic device 110. In the example of FIG. 8, the user interface view 800 includes a list of previously recorded physical activities 802 (e.g., workouts such as running, stair climbing, and rowing). For example, each of the physical activities 802 may have been recorded using one or more sensors of electronic device 104 or electronic device 110 while a user was wearing or carrying the device (e.g., responsive to the user and/or the sensors initiating recording of the physical activity). For example, as a user wearing a smart watch begins a run, the user may initiate recording of the run using a health application running on the smart watch. During the run, the smart watch may periodically and/or continuously record sensor data such as heart rate data, GPS data, acceleration data, altitude data, or the like for the user. The smart watch may also trigger recording of audio data using a microphone of the smart watch, and/or using one or more microphones of paired headphones such as audio device 150.

The health application running on the smart watch may trigger the audio device(s) 150 to periodically, randomly, or continuously capture audio data during the workout. For example, as the user engages in a workout, approximately five-second audio snippets may be collected at random times. The obtained snippets may be stored at the audio device or provided to the smart watch for storage. After the workout is ended, the last few snippets may be selectively sent to the ML engine 220 at the smart watch (e.g., at electronic device 104) or transferred to an ML engine 220 at another associated device (e.g., at electronic device 110) for processing.

A detected respiratory rate output by the ML engine 220 may be provided to the health application and stored in connection with the workout. For example, as shown by the user interface view 803 of FIG. 8, the user can view the learned respiratory rates 804 and breathing intensity classifications 805 provided by the multi-task learning network. As indicated in FIG. 8, respiratory rates for select events may be written to a health app (e.g., those in which breathing was recognized), and other events (e.g., workouts) 806 in which no breathing was detected, may be provided without respiratory rates in the user interface view.

In one or more implementations, alerts may be provided by a health application, such as to notify users of anomalous breathing rates with environmental conditions taken into consideration. For example, in one or more implementations, a health application may compare respiratory rate changes over time for similar activities. A respiratory rate that is unusually high for a particular activity (e.g., above the average or median respiratory rate for that activity for that user by more than a threshold) may cause a user alert (e.g., an audio, visual, or tactile alert) to be provided to the user and/or to a health or safety professional.

Respiratory rates and pulse rates (also referred to herein as heart rates) may vary in similar patterns across workout stages. For example, a user's RR variations in comparison with the user's heartrate variation may differ according to the users age, gender, and fitness level. In one or more implementations, movements over time of a comparison between the user's RR and pulse rate may also be used to generate physical fitness and/or health information and/or alerts.

Figure 9:
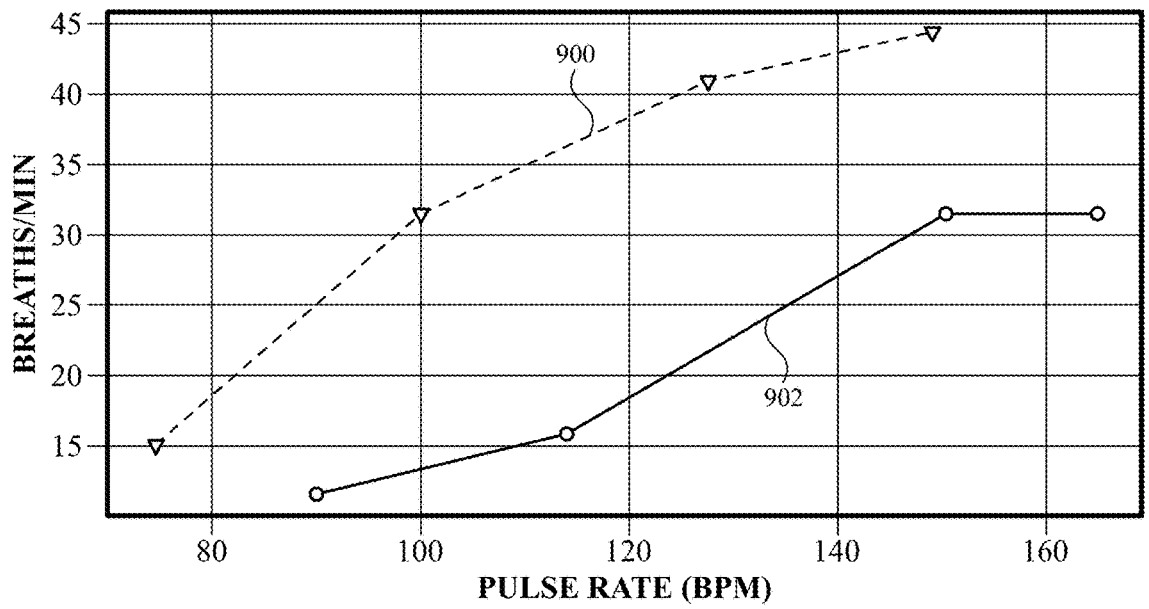
FIG. 9 illustrates exemplary respiratory rates and pulse rates in accordance with one or more implementations.

For example, FIG. 9 illustrates two exemplary RR vs. pulse rate curves 900 and 902 for two respective users. A health application (e.g., running on electronic device 104 or electronic device 110) may track changes in the RR vs. pulse rate curve for a particular user, and/or may compare the RR vs. pulse rate curve of a particular user to a baseline RR vs. pulse rate curve. In one or more implementations, an alert may be generated if a significant difference is detected between a current RR vs. pulse rate curve for the user and baseline RR vs. pulse rate curve (e.g., established using past RR vs. pulse rate curves for that user, and/or established for a group of users having similar age, gender, fitness level, or the like).

In accordance with aspects of the disclosure, an electronic device such as electronic device 110 (e.g., a smartphone, a tablet, or the like) may include a memory (see, e.g., ROM 1110, storage 1102 or system memory 1104 of FIG. 11) storing a multi-task learning network (e.g., an implementation of ML engine 220) that includes a breath embedding layer and a noise embedding layer. The electronic device may also include one or more processors (see, e.g., processor(s) 1112 of FIG. 11) configured to obtain at least one audio recording of at least one breath cycle of a user from an audio device that is configured to output audio content provided by the electronic device. The one or more processors may also provide audio input data (e.g., audio input data 406 and/or preprocessed audio data 409) corresponding to the at least one audio recording to the multi-task learning network. The one or more processors may also obtain, as an output from the multi-task learning network, at least a respiratory rate of the user. The one or more processors may also provide the respiratory rate for display by a display of the electronic device.

For example, the audio device may include a pair of wearable earbuds that are wirelessly paired to the electronic device. The one or more processors may provide the respiratory rate for display in connection a workout using a health application at the electronic device (e.g., as described above in connection with FIG. 8 and/or FIG. 9). The one or more processors may also receive additional health data from another electronic device (e.g., electronic device 104) in connection with the workout. For example, the other device may be a wearable electronic device (e.g., a smart watch) that includes at least one sensor (e.g., a PPG sensor), and the additional health data may include a pulse rate or a blood oxygen level determined using the at least one sensor.

Figure 10:
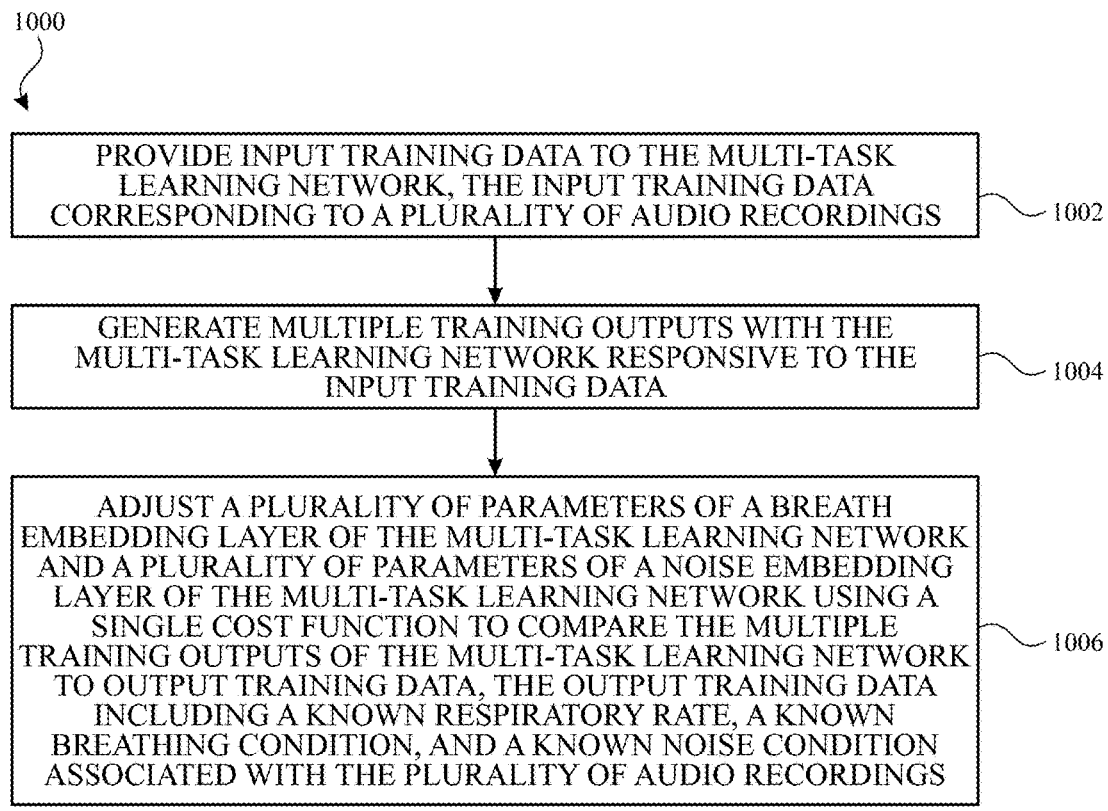
FIG. 10 illustrates a flow diagram of an example process for training a multi-task learning network for respiratory analysis using audio data in accordance with one or more implementations.

FIG. 10 illustrates a flow diagram of an example process for training a multi-task learning model to perform respiratory analysis using audio data (e.g., for estimation of respiratory rate from audio data) in accordance with one or more implementations. For explanatory purposes, the process 1000 is primarily described herein with reference to the audio device 150, electronic device 104, and the electronic device 110 of FIG. 1. However, the process 1000 is not limited to the audio device 150, electronic device 104, and the electronic device 110 of FIG. 1, and one or more blocks (or operations) of the process 1000 may be performed by one or more other components of the server 120 and/or by other suitable devices. Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

At block 1002, input training data may be provided to the multi-task learning network, the input training data corresponding to a plurality of audio recordings (e.g., audio samples 302).

At block 1004, multiple training outputs may be generated with the multi-task learning network responsive to the input training data. For example, the multiple training outputs may include a respiratory rate training output, a breathing condition training output, and a noise condition training output.

At block 1006, a plurality of parameters (e.g., weights, biases, and/or other parameters) of a breath embedding layer of the multi-task learning network and a plurality of parameters (e.g., weights, biases, and/or other parameters) of a noise embedding layer of the multi-task learning network may be adjusted using a single cost function (e.g., cost function 414) to compare the multiple training outputs of the multi-task learning network to output training data. For example, the output training data may include a known respiratory rate, a known breathing condition, and a known noise condition associated with the plurality of audio recordings. As described herein, the single cost function may include a concordance correlation coefficient loss, a breath cross-entropy loss, and/or a noise cross-entropy loss (e.g., as described above in connection with Equation (2)).

Aspects of the subject disclosure may facilitate the use of accessible, aesthetically acceptable wearable headphones to provide a technologically efficient and cost-effective method to estimate respiratory rate and track cardio-respiratory fitness over time.

Aspects of the subject disclosure may provide improvements over existing technologies by providing the ability to, for example, (i) estimate a respiratory rate from a wearable microphone under natural ambient conditions both indoors and outdoors, (ii) use a model-driven approach to estimate respiratory rate directly from filterbank energies, and/or (iii) introduce situational awareness through multi-task learning to generate a model that is capable of discerning high SNR conditions from low SNR conditions.

Aspects of the subject disclosure may provide improvements over existing technologies by providing the ability to measure respiratory rate, respiratory count, and/or breathlessness using data collected from natural conditions from both indoor and outdoor background conditions, using perceptually graded data, and with an end-to-end system that can consume filterbank energies to directly predict respiratory rates and make heavy breathing classifications. Although examples of specific networks are described herein in connection with various examples, aspects of the subject technology can be applied to other end-to-end respiratory rate estimation models.

Aspects of the subject technology may facilitate estimations and/or measurements of RR from audio captured using wearable microphones, which can facilitate the detection of heavy breathing conditions and the monitoring of RR changes, a measure of cardio-respiratory fitness, over time. Data augmentation (e.g., with simple acoustic distortion) can also be applied as an effective tool to reduce error rates.

The present disclosure recognizes that the use of such personal information data, in the present technology, can be used to the benefit of users. For example, the personal information data such as audio recording data can be used for estimation of respiratory rates, breathing condition, and/or related health characteristics and/or conditions.

The present disclosure contemplates that those entities responsible for the collection, analysis, disclosure, transfer, storage, or other use of such personal information data, including audio recordings, will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of audio recording to respiratory analysis and/or monitoring, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition, speech recognition, or voice recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 11:
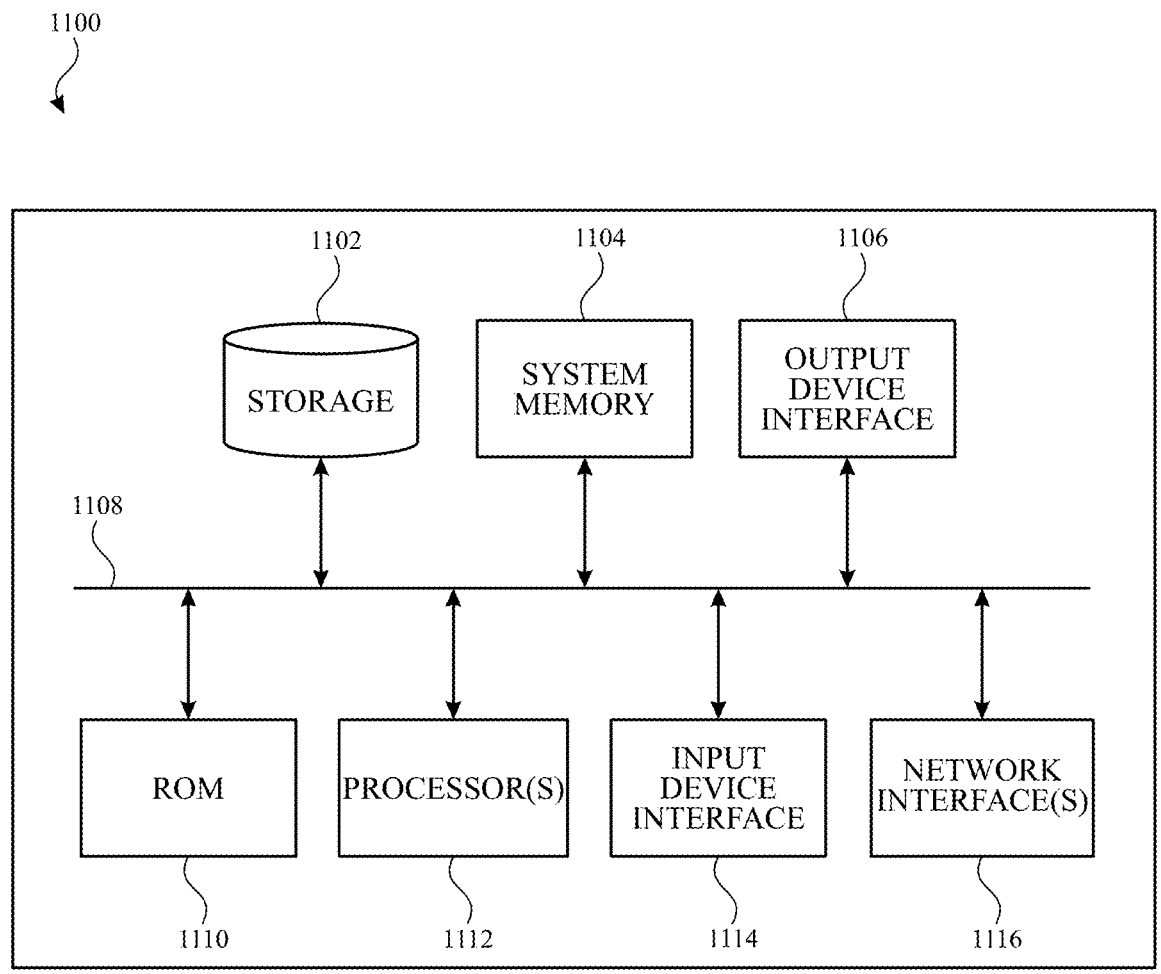
FIG. 11 illustrates an electronic system with which one or more implementations of the subject technology may be implemented.

FIG. 11 illustrates an electronic system 1100 with which one or more implementations of the subject technology may be implemented. The electronic system 1100 can be, and/or can be a part of, the audio device 150, the electronic device 104, the electronic device 110, and/or the server 120 shown in FIG. 1. The electronic system 1100 may include various types of computer readable media and interfaces for various other types of computer readable media. The electronic system 1100 includes a bus 1108, one or more processing unit(s) 1112, a system memory 1104 (and/or buffer), a ROM 1110, a permanent storage device 1102, an input device interface 1114, an output device interface 1106, and one or more network interfaces 1116, or subsets and variations thereof.

The bus 1108 collectively represents all system, peripheral, and chipset buses that communicatively connect the numerous internal devices of the electronic system 1100. In one or more implementations, the bus 1108 communicatively connects the one or more processing unit(s) 1112 with the ROM 1110, the system memory 1104, and the permanent storage device 1102. From these various memory units, the one or more processing unit(s) 1112 retrieves instructions to execute and data to process in order to execute the processes of the subject disclosure. The one or more processing unit(s) 1112 can be a single processor or a multi-core processor in different implementations.

The ROM 1110 stores static data and instructions that are needed by the one or more processing unit(s) 1112 and other modules of the electronic system 1100. The permanent storage device 1102, on the other hand, may be a read-and-write memory device. The permanent storage device 1102 may be a non-volatile memory unit that stores instructions and data even when the electronic system 1100 is off. In one or more implementations, a mass-storage device (such as a magnetic or optical disk and its corresponding disk drive) may be used as the permanent storage device 1102.

In one or more implementations, a removable storage device (such as a floppy disk, flash drive, and its corresponding disk drive) may be used as the permanent storage device 1102. Like the permanent storage device 1102, the system memory 1104 may be a read-and-write memory device. However, unlike the permanent storage device 1102, the system memory 1104 may be a volatile read-and-write memory, such as random access memory. The system memory 1104 may store any of the instructions and data that one or more processing unit(s) 1112 may need at runtime. In one or more implementations, the processes of the subject disclosure are stored in the system memory 1104, the permanent storage device 1102, and/or the ROM 1110. From these various memory units, the one or more processing unit(s) 1112 retrieves instructions to execute and data to process in order to execute the processes of one or more implementations.

The bus 1108 also connects to the input and output device interfaces 1114 and 1106. The input device interface 1114 enables a user to communicate information and select commands to the electronic system 1100. Input devices that may be used with the input device interface 1114 may include, for example, alphanumeric keyboards and pointing devices (also called "cursor control devices"). The output device interface 1106 may enable, for example, the display of images generated by electronic system 1100. Output devices that may be used with the output device interface 1106 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 1108 also couples the electronic system 1100 to one or more networks and/or to one or more network nodes, such as the audio device 150, the electronic device 104, or electronic device 110 shown in FIG. 1, through the one or more network interface(s) 1116. In this manner, the electronic system 1100 can be a part of a network of computers (such as a LAN, a wide area network ("WAN"), or an Intranet, or a network of networks, such as the Internet. Any or all components of the electronic system 1100 can be used in conjunction with the subject disclosure.

The disclosed systems and methods provide technical advantages for estimating a respiratory rate from audio data captured using a wearable, near-field microphone. The disclosed systems and methods provide estimated respiration rates with a high CCC value of approximately 75%, compared to a ground truth (e.g., manually labeled) respiration rate. In one or more implementations, time convolution operations can be performed on the audio data to improve estimates of the respiratory rates, and also provide improve robustness of the estimates against sparse data points. In one or more implementations, a multi-task learning framework is provided with which a heavy breathing condition can be detected with an F1—score of, for example, 66%. These disclosed systems and methods allow a RR to be estimated from audio signals obtained from a wearable, near-field microphone, and in turn can be useful in detecting heavy breathing conditions.

In accordance with aspects of the disclosure, a method is provided that includes obtaining at least one audio recording of at least one breath cycle of a user; providing audio input data corresponding to the at least one audio recording to a multi-task learning network that includes a breath embedding layer and a noise embedding layer; and obtaining, as an output from the multi-task learning network, at least a respiratory rate of the user.

In accordance with aspects of the disclosure, an electronic device is provided that includes a memory storing a multi-task learning network that includes a breath embedding layer and a noise embedding layer; and one or more processors configured to: obtain at least one audio recording of at least one breath cycle of a user from an audio device that is configured to output audio content provided by the electronic device; provide audio input data corresponding to the at least one audio recording to the multi-task learning network; obtain, as an output from the multi-task learning network, at least a respiratory rate of the user; and provide the respiratory rate for display by a display of the electronic device.

In accordance with aspects of the disclosure, a method for training a multi-task learning network for estimation of respiratory rates from audio data is provided, the method including providing input training data to the multi-task learning network, the input training data corresponding to a plurality of audio recordings; generating multiple training outputs with the multi-task learning network responsive to the input training data; and adjusting a plurality of parameters of a breath embedding layer of the multi-task learning network and a plurality of parameters of a noise embedding layer of the multi-task learning network using a single cost function to compare the multiple training outputs of the multi-task learning network to output training data, the output training data including a known respiratory rate, a known breathing condition, and a known noise condition associated with the plurality of audio recordings.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
obtaining at least one audio recording of at least one breath cycle of a user;
providing audio input data corresponding to the at least one audio recording to a multi-task recurrent network trained using a multi-task objective function to generate a respiratory rate and an indication of a breathing condition from a breath embedding layer of the multi-task recurrent network and an indication of a background noise of the at least one audio recording from a noise embedding layer of the multi-task recurrent network; and
obtaining, as an output from the multi-task recurrent network, the indication of the background noise of the at least one audio recording from the noise embedding layer and at least one of the respiratory rate of the user or the indication of the breathing condition of the user.

2. The method of claim 1, wherein obtaining the at least one audio recording of the at least one breath cycle of the user comprises obtaining multiple audio recordings each having a duration of between three seconds and ten seconds.

3. The method of claim 2, wherein obtaining the multiple audio recordings comprises obtaining the multiple audio recordings with a near-field microphone of a wearable audio device.

4. The method of claim 3, wherein obtaining the multiple audio recordings comprises obtaining the multiple audio recordings responsive to receiving a trigger from a health application on an electronic device.

5. The method of claim 4, further comprising, with a speaker of the wearable audio device, outputting audio content from the electronic device.

6. The method of claim 5, wherein obtaining the multiple audio recordings comprises obtaining the multiple audio recordings with the wearable audio device while outputting the audio content with the wearable audio device.

7. The method of claim 4, wherein providing the audio input data to the multi-task recurrent network comprises providing the audio input data to the multi-task recurrent network at the wearable audio device.

8. The method of claim 4, further comprising providing the multiple audio recordings to the electronic device, wherein providing the audio input data to the multi-task recurrent network comprises providing the audio input data to the multi-task recurrent network at the electronic device.

9. The method of claim 4, further comprising providing the multiple audio recordings to an additional electronic device, wherein providing the audio input data to the multi-task recurrent network comprises providing the audio input data to the multi-task recurrent network at the additional electronic device.

10. The method of claim 9, wherein the electronic device comprises a smart watch and wherein the additional electronic device comprises a smartphone.

11. The method of claim 4, further comprising obtaining additional sensor data with a sensor of the electronic device.

12. The method of claim 11, wherein the additional sensor data comprises multiple heart rate measurements each corresponding to one of the multiple audio recordings.

13. The method of claim 4, wherein obtaining the multiple audio recordings comprises obtaining the multiple audio recordings at a corresponding plurality of times associated with a recording of a workout by the electronic device.

14. The method of claim 13, wherein the corresponding plurality of times include at least one time within a minute prior to an end time of the workout and at least one time within a minute after the end time of the workout and the method further comprising:
providing the respiratory rate for display in association with additional information for the workout by a user interface of the health application.

15. The method of claim 1, wherein the multi-task objective function comprises a loss function.

16. The method of claim 1, wherein the indication of the breathing condition of the user comprises a classification indicating a normal breathing condition or a heavy breathing condition of the user.

17. The method of claim 1, wherein the indication of the background noise of the at least one audio recording comprises a classification indicating a noise condition or a noiseless condition of an environment of the user.

18. The method of claim 17, wherein obtaining the respiratory rate and the breathing condition comprise obtaining the respiratory rate and the breathing condition with the breath embedding layer of the multi-task recurrent network, and wherein obtaining the noise condition of the at least one audio recording comprises obtaining the noise condition with the noise embedding layer of the multi-task recurrent network.

19. The method of claim 1, further comprising generating the audio input data by generating at least one spectrogram from at least one audio recording.

20. The method of claim 19, wherein generating the audio input data further comprises performing a time-convolution of the at least one spectrogram.

21. The method of claim 19, further comprising, prior to generating the at least one spectrogram:
determining whether a portion of the at least one audio recording includes a recording of human speech; and
discarding any portion of the at least one recording that includes the recording of the human speech.

22. An electronic device, comprising:
a memory storing a multi-task recurrent network that includes a breath embedding layer and a noise embedding layer; and
one or more processors configured to:
obtain at least one audio recording of at least one breath cycle of a user from an audio device that is configured to output audio content provided by the electronic device;
provide audio input data corresponding to the at least one audio recording to the multi-task recurrent network trained using a multi-task objective function to generate a respiratory rate, an indication of a breathing condition from a breath embedding layer of the multi-task recurrent network and an indication of a background noise of the at least one audio recording from a noise embedding layer of the multi-task recurrent network;
obtain, as an output from the multi-task recurrent network, an indication of a background noise of the at least one audio recording from the noise embedding layer and at least one of the respiratory rate of the user or the indication of a breathing condition of the user; and
provide the indication of the background noise and at least one of the respiratory rate or the breathing condition for display by a display of the electronic device.

23. The electronic device of claim 22, wherein the audio device comprises a pair of wearable earbuds that are wirelessly paired to the electronic device.

24. The electronic device of claim 22, wherein the one or more processors are configured to provide the respiratory rate for display in connection with a workout using a health application at the electronic device.

25. The electronic device of claim 24, wherein the one or more processors are further configured to receive additional health data from another electronic device in connection with the workout.

26. The electronic device of claim 25, wherein the another electronic device comprises a wearable electronic device comprising at least one sensor, and wherein the additional health data comprises a pulse rate or a blood oxygen level determined using the at least one sensor.

27. A method of training a multi-task recurrent network for estimation of respiratory rates from audio data, the method comprising:
  providing input training data to the multi-task recurrent network, the input training data corresponding to a plurality of audio recordings;
  generating multiple training outputs with the multi-task recurrent network responsive to the input training data; and
  adjusting a plurality of parameters of a breath embedding layer of the multi-task recurrent network and a plurality of parameters of a noise embedding layer of the multi-task recurrent network using a multi-task objective function to compare the multiple training outputs of the multi-task recurrent network to output training data, the output training data including a known respiratory rate, a known breathing condition, and a known noise condition associated with the plurality of audio recordings.

28. The method of claim 27, wherein the multi-task objective function comprises a concordance correlation coefficient loss, a breath cross-entropy loss, and a noise cross-entropy loss.

* * * * *